United States Patent Office 2,990,244
Patented June 27, 1961

2,990,244
EXTRACTION OF THORIUM AND URANIUM VALUES FROM ACID LEACH LIQUORS

Keith B. Brown and David J. Crouse, Jr., Oak Ridge, Tenn., assignors to the United States of America as represented by the United States Atomic Energy Commission
No Drawing. Filed Dec. 24, 1957, Ser. No. 705,078
1 Claim. (Cl. 23—14.5)

Our invention relates to a method for recovering thorium values from a mixture containing said values together with extraneous materials, and particularly to a liquid-liquid extraction method for the recovery of thorium values by the use of amines as the extracting agents.

There are several basic processes which have been used in the prior art for recovering thorium values from aqueous solutions containing said values including precipitation, ion-exchange resin sorption and liquid-liquid extraction. There are particular advantages in the use of liquid-liquid extraction techniques; however, the prior art solvent extraction processes, specifically those using tributylphosphate as the extracting agent, were not applicable to aqueous systems containing sulfate or phosphate as the predominant anions. Inasmuch as some of the more important thorium-bearing ores contain high concentrations of phosphate, and it is desirable for economic reasons to use sulfuric acid as an ore leaching agent, the prior art extractants were not suitable in a large area of thorium-recovery work.

One object of our invention is to provide an improved method for the recovery of thorium values from an acidic aqueous solution containing said values together with extraneous materials.

Another object of our invention is to provide an improved liquid-liquid extraction method for recovering thorium values as an extremely pure product.

Yet another object of our invention is to provide a liquid-liquid extraction process for the recovery of thorium values from an acidic aqueous solution containing said values together with a high concentration of sulfate ions.

Still another object of our invention is to provide an improved method for the separation and segregation of thorium and uranium values from an acidic aqueous solution containing said values.

Another object of our invention is to provide an improved method for the recovery of thorium values as an extremely pure product from an acidic aqueous solution containing said values together with rare earth values.

Still another object of our invention is to provide an improved method for the recovery of thorium from a thorium-bearing ore.

Yet another object of our invention is to provide an improved liquid-liquid extraction method of recovering thorium from a thorium-bearing ore wherein the ore has been contacted with sulfuric acid.

Additional objects and advantages of our invention will become apparent to those skilled in the art from the following detailed description and the claims appended hereto.

In accordance with our invention thorium values may be recovered from an acidic aqueous solution containing said values together with extraneous impurities by a process which comprises contacting said thorium-containing solution with an organic solution comprised of a substantially water-immiscible, non-polar, organic diluent and an amine having the formula

where $R_1$ is selected from the group consisting of alkyl and alkylene radicals, and $R_2$ is selected from the group consisting of hydrogen, alkyl radicals, and alkylene radicals, the total number of carbon atoms in said amine being at least 10, whereby thorium values are extracted into the organic phase, separating the resultant thorium-loaded organic phase from the remaining depleted aqueous phase, and recovering thorium values from said separated organic phase.

In using our invention it is possible to recover thorium values from an acidic aqueous solution containing sulfate and phosphate ions with a minimum number of process steps, and high thorium recovery is possible even when the thorium is present in a very low concentration. In using our invention it is a simple matter to segregate and recover uranium values as well as thorium values, and to segregate both from rare-earth values. Our invention may not only be used to recover thorium from thorium-bearing ores, but also may be used to recover thorium from other thorium-bearing liquids such as that contained in a single-region homogeneous breeder reactor.

In using the process of our invention the thorium-bearing acidic aqueous solution is contacted with an organic phase containing a primary or a secondary amine. We have found that primary and secondary amines show excellent extraction powers for thorium, and that this extraction power exists for those amines having unsaturated as well as saturated radicals and for amines having short as well as long chain radicals. However, in view of the higher solubility of the lower molecular weight amines in water and the subsequent loss to the water phase of those amines in the extraction step, we prefer to use amines having at least 10 carbon atoms. The following table gives the thorium extraction coefficients of several typical amines which may be used in our process. The thorium extraction coefficient is a measure of the extraction power for thorium, and is defined as the ratio of the concentration of the thorium in the organic extractant to the concentration of the thorium in the aqueous solution at equilibrium.

Other typical amines which are suitable as thorium extractants are 1-(3-ethylpentyl-4-ethyloctyl), 1-undecyl-lauryl, N-benzyl-1-(3-ethylpentyl-4-ethyloctyl), di-n-decyl, di-n-octyl, and di(2-butyloctyl).

While we have found that undiluted liquid primary and secondary amines will extract thorium from aqueous acidic solutions, the extractants became very viscous and difficult to handle, and we prefer to dissolve the extraction reagent in a diluent which should have the following characteristics: (1) substantial immiscibility with the aqueous solution; (2) ability to dissolve the extraction reagent, its salts with anions encountered in extraction and stripping, and the extracted thorium complex; (3) freedom from interfering interaction with the extraction reagent, and (4) suitable density and viscosity for ready separation from the aqueous phase.

TABLE I

*Extraction of thorium from an acidic aqueous solution with amines*

Aqueous feed:
    0.20 g. Th, 1.1 g. Fe (II), and 0.9 g. Fe (III) per liter.
    A; 0.4 molar $SO_4$, pH 0.9.
    B; 0.9 molar $SO_4$, pH 0.5.
Organic: 0.1 molar amine in kerosene.
Phase ratio, aqueous/organic=2.

| Amine | Aqueous | Th, g./liter Aqueous | Th, g./liter Organic | Fe in Organic, g./liter | Thorium Extraction Coefficient |
|---|---|---|---|---|---|
| Rohm & Haas 9D-178 [a] | A | 0.027 | 0.34 | 0.11 | 13 |
| Armeen 212 [b] | A | 0.004 | 0.40 | 0.03 | 100 |
| Di(tridecyl P) amine [d] | A | 0.003 | 0.42 | 0.35 | 140 |
| Primene JM-T [e] | A | <0.003 | 0.39 | 0.91 | >130 |
| Rohm & Haas 9D-178 [a] | B | 0.097 | 0.19 | 0.26 | 2 |
| Armeen 212 [b] | B | 0.014 | 0.36 | 0.016 | 26 |
| Di(tridecyl P) amine [d] | B | <0.003 | 0.40 | 0.047 | >130 |
| Primene JM-T [e] | B | <0.003 | 0.39 | 0.81 | >130 |

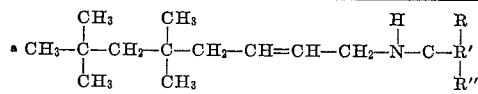

Where R+R′+R″=11–14 carbon atoms.
[b] Principally dilaurylamine.
[c] Diluent was kerosene modified with 5 volume percent tridecyl alcohol.

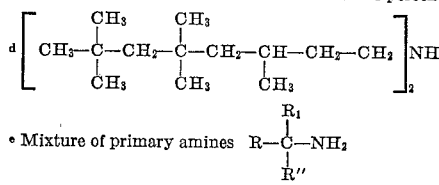

[e] Mixture of primary amines $R-\underset{R''}{\overset{R_1}{C}}-NH_2$

Where R+R′+R″=15–21 carbon atoms.

We have found aromatic solvents, such as benzene, toluene, and xylene, chlorinated solvents, such as chloroform and carbon tetrachloride, and aromatic petroleum fractions to be suitable diluents. The aromatic petroleum fractions are illustrated by "Amsco G," "Amsco D–95," "Solvesso 100," and "Solvesso 150." The following table gives physical data which more specifically identifies these aromatics.

TABLE II

| Physical Property | Diluent | | | |
|---|---|---|---|---|
| | Amsco[a] D-95 | Amsco[a] G | Solvesso 100 | Solvesso 150 |
| Sp. Gr., 60/60° F | 0.8756 | 0.8866 | 0.8721 | 0.8964 |
| API Gr. @ 60° F | 30.1 | 28.1 | 30.7 | 26.3 |
| Distillation, ° F., ASTM: | | | | |
|   Initial Boiling Point | 284 | 364 | 318 | 365 |
|   5% | | | 321 | 370 |
|   50% | 310 | 373 | 325 | 379 |
|   90% | | | 329 | 390 |
|   95% | | | 331 | 397 |
|   Dry end Point | 390 | 400 | 355 | 425 |
|   Final end Point | 395 | 404 | | |
| Flash Point, ° F. (tag closed cup) | 92 | 150 | 115 | 152 |
| Kauri-Butanol Value | 973 | 87.0 | 89.5 | 88.3 |
| Viscosity, cs., 25° C | | | 0.908 | 1.376 |
| Surface Tension (dynes/cm.) @ 25° C | | | 31.0 | 32.3 |

[a] An aromatic petroleum fraction from hydroforming process.

We have found that the aliphatic hydrocarbons such as kerosene are useful diluents for most amines. For those amines where kerosene is not a suitable diluent, kerosene modified with a long chain alcohol may be used. Typical useful long chain alcohols are capryl alcohol and tridecyl alcohol, and suitable alcohol concentrations are from 2 to 10 voume percent.

We have found that the concentration of the amine in the extractant is not critical and that when the excess of amine is sufficient to avoid saturation effects, the thorium extraction coefficient is approximately proportional to the concentration of the amine in the extractant. We have found an amine concentration of from 0.02 to over 0.5 molar to be suitable, and a concentration of from approximately 0.05 molar to 0.2 molar is preferred. The maximum thorium loading is approximately 1 mole of thorium per 8 moles of amine.

The temperature at which our process is carried out is not critical, at least up to 50° C., although the extraction power does decrease somewhat with an increase in temperature. We prefer to carry out our process at approximately 25–35° C.

In extracting thorium from acidic aqueous solutions, we found that the extraction step will work well over an initial pH range of from less than zero to approximately 3.0 and an initial range of from approximately 0.5 to 1.5 is preferred.

Our invention is particularly useful in segregation and recovery of thorium and uranium values from acidic aqueous solutions containing both elements because of discoveries we have made concerning the relative extraction power of different amines for thorium and uranium. We have found that the tertiary amines are excellent extractants for uranium but extract essentially no thorium.

We have further found that secondary amines having branching on at least one of the carbon atoms adjacent to the nitrogen atom are stronger extractants for uranium than for thorium. Other secondary amines and the primary amines are stronger extractants for thorium than for uranium. Separation of thorium and uranium using these primary and secondary amines can be achieved by suitable control of the operating conditions, i.e., by loading the organic phase to near-saturation with uranium when a uranium-selective amine is used, or by loading the oragnic phase to near-saturation with thorium when a thorium-selective amine is used.

Typical useful tertiary amines are tri-n-hexylamine, tri-n-octylamine, tri-n-decylamine, tri-laurylamine, tri-iso-octylamine, methyldi-n-octylamine, methyldilaurylamine, tri(tridecyl) amine, and n-butyldidodecenylamine.

A typical secondary amine which is a stronger extractant for uranium than for thorium is bis(1-isobutyl-3,5- dimethylhexyl) amine. Typical secondary amines which are stronger extractants for thorium than for uranium are di-n-decylamine, dilaurylamine, di-n-octylamine, di(2-butyloctyl)amine and di(tridecyl P)amine.

The following table gives the extraction coefficients of several amines for thorium and uranium in an acidic aqueous solution containing both.

TABLE III

*Uranium-thorium extraction with amines*

Aqueous: 1 g. U, 0.5 g. Th per liter; 0.5 molar SO$_4$; pH 0.9.
Organic: 0.1 molar amine.

| Oragnic Phase | Phase Ratio (Aqueous) Organic | Final Concentration, g. per liter | | | | Extraction Coefficient | |
|---|---|---|---|---|---|---|---|
| | | Aqueous | | Organic | | | |
| | | U | Th | U | Th | U | Th |
| R & H 9D-178 Amine [a] in kerosene+2 volume percent capryl alcohol | 3 | 0.047 | 0.41 | 2.8 | 0.25 | 60 | 0.6 |
| Bis(1-isobutyl-3, 5-dimethylhexyl)amine in kerosene | 3 | 0.024 | 0.41 | 3.0 | 0.26 | 125 | 0.63 |
| | 6 | 0.26 | 0.50 | 4.5 | 0.021 | 17 | 0.04 |
| Tri-n-octylamine in Kerosene+2 volume per cent capryl alcohol | 3 | 0.011 | 0.47 | 2.8 | <0.02 | 250 | <0.05 |
| Tri(iso-octyl)amine in kerosene + 3 volume percent tridecyl alcohol | 3 | 0.019 | 0.49 | 2.8 | <0.02 | 150 | <0.05 |
| | 6 | 0.18 | 0.51 | 4.8 | <0.02 | 27 | <0.05 |

[a] See Table I for structure of amine.

Table III illustrates the selectivity for uranium over thorium of tertiary amines and of secondary amines having branching on a carbon atom close to the nitrogen atom. A comparison of the data of Table III with Table I shows a decrease in the amount of thorium extracted in the presence of uranium when a typical uranium selective secondary amine, R & H 9D-178, is used.

The following table gives data which illustrate the selectivity for thorium over uranium of a typical primary amine.

TABLE IV

*Selective extraction of thorium*

Aqueous: 1.35 g. U, 0.20 g. Th, and 45 g. SO$_4$ per liter; pH 0.90.
Organic: 0.046 molar Primene JM-T [a] in kerosene.

| Phase Ratio (Aqueous/Organic) | Concentration, g. per liter | | | | Extraction Coefficient | |
|---|---|---|---|---|---|---|
| | Organic Phase | | Aqueous Phase | | | |
| | Th | U | Th | U | Th | U |
| 5 | 1.0 | 0.117 | 0.003 | 1.3 | 330 | 0.090 |
| 8 | 1.3 | 0.042 | 0.046 | 1.3 | 28 | 0.035 |
| 11 | 1.3 | 0.028 | 0.084 | 1.3 | 15 | 0.023 |

[a] See Table I for structure of amine.

In using our invention to segregate and recover thorium and uranium from an acidic aqueous solution containing both elements, several alternative methods of operating are possible. If desired, the aqueous solution containing both thorium and uranium can be contacted with an amine which is selective for thorium, the phases separated and the aqueous phase then contacted with an amine which is selective for uranium; or, alternatively, the original aqueous solution could be contacted with a uranium-selective amine first, then a thorium-selective amine. Suitable methods will be apparent to one skilled in the art.

The extracted thorium values can be recovered from the organic phase by means well-known to those skilled in the art, such as by evaporation. However, we have discovered methods for recovering thorium values from the organic phase which are particularly suited for large scale use.

After the extraction step the thorium-loaded extractant is transferred to a stripping section and is contacted with an aqueous phase containing a stripping agent. The choice to be made from several suitable methods may be arbitrary, or in some particular applications it may be indicated by particular process conditions or objectives.

We have found that thorium values may be precipitated directly from the organic solution with an aqueous solution of hydroxyl ions, or can be removed from the organic solution in soluble form with aqueous solutions of a variety of reagents including the carbonate ions, the chloride ion and the nitrate ion. Where the thorium is stripped in soluble form, recovery of thorium from the aqueous solution is accomplished by methods commonly used in the prior art, such as by precipitation.

The following equations illustrate the reactions which may take place during the stripping cycle. These equations are given, for convenience, in terms of a primary amine, and in terms of (RNH$_3$)$_2$Th(SO$_4$)$_3$ which is one of the possible extracted thorium forms.

Stripping with chloride:

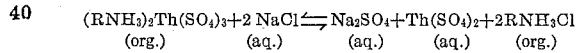
(org.)  (aq.)  (aq.)  (aq.)  (org.)

and

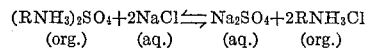
(org.)  (aq.)  (aq.)  (org.)

Stripping with nitrate:

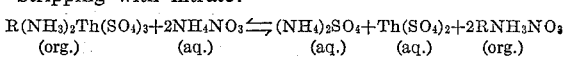
(org.)  (aq.)  (aq.)  (aq.)  (org.)

and

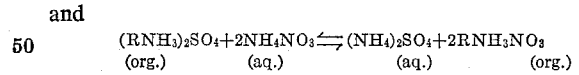
(org.)  (aq.)  (aq.)  (org.)

Stripping with carbonate:

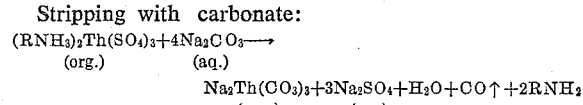
(org.)  (aq.)

Na$_2$Th(CO$_3$)$_3$+3Na$_2$SO$_4$+H$_2$O+CO↑+2RNH$_2$
(org.)  (aq.)

In each of these stripping reactions, it is preferred that some excess of the stripping agent is provided over the stoichiometric amounts required by the reactions shown, plus the amounts required by the analogous reactions with any other extracted materials. The concentrations at which these stripping agents are used are not critical.

If either chloride or nitrate is to be used as the stripping agent, it can be furnished as a neutral salt or as an acid. However, slightly acidic salt solutions are ordinarily preferred. NaCl or NH$_4$NO$_3$ are suitable salts, and any acid used in the stripping solution can be furnished as HCl, HNO$_3$, or H$_2$SO$_4$. We prefer to use 0.5 molar to 3 molar NaCl or NH$_4$NO$_3$ solutions having an acid concentration no greater than one molar if HNO$_3$ or HCl is used or 0.1 molar if H$_2$SO$_4$ is used.

The thorium enters the aqueous stripping solution at a relatively high concentration, e.g. 10 to 80 grams per liter, and can be recovered in product form by methods well-known in the art. The amine leaves the stripping step in the form of the chloride or nitrate salt. It can be recycled as such to the extraction step, but we prefer, especially when nitrate is used, to remove the anion by contacting the organic phase with a basic reagent such as ammonium hydroxide, calcium hydroxide, or sodium carbonate, and to recycle the amine in the free-base form. With chloride, a suitable method is to use a low cost base, e.g., calcium hydroxide, and to discard the resulting chloride salt. With nitrate, a suitable method is to select a base such that the resulting salt, e.g., $NH_4NO_3$, can be recycled to the stripping step.

If carbonate ion is used as the stripping agent it can be furnished as sodium carbonate. A wide range of concentrations can be used, e.g., from 0.2 molar to 1.5 molar sodium carbonate, but we prefer to use a concentration between 0.5 molar and 1.0 molar. The thorium, which enters the aqueous stripping solution in a soluble form if a large excess of stripping agent is used, can be removed in product form by methods well-known in the art. We prefer, however, to precipitate the thorium from the organic phase as a mixture of thorium carbonate and sulfate salts by controlling the amount of carbonate in the stripping solution. We have found that the use of 8 to 9 moles of $Na_2CO_3$ per mole of thorium gives excellent recovery of thorium as a precipitate from the organic phase.

If a process involving separate extraction of uranium is desired, the stripping of the uranium from the uranium-containing organic phase may be accomplished substantially as the stripping of the thorium described above. For more details concerning uranium extraction with amines and subsequent stripping of uranium from the organic phase, attention is invited to the co-pending application of the common assignee, Serial No. 627,515, now U.S. Patent No. 2,877,250, issued March 10, 1959, in the names of Keith B. Brown, David J. Crouse, Jr., and John C. Moore for "Recovery of Uranium Values."

Contacting the organic and aqueous phases in the extraction step and in the stripping step may be accomplished in mixer-settlers, pulse columns, or any other suitable liquid-liquid contactor, and the contact may be made in countercurrent or co-current fashion. The extractant may be recycled, or may be discarded after one use; however, we prefer to recycle the extractant. Unless the stripping agent is used in large excess, it normally is not recycled.

Having thus described our invention, the following examples are offered to illustrate our invention in greater detail.

EXAMPLE I 10,000 pounds of a uranium-thorium ore is digested with 1200 gallons of 5% $H_2SO_4$ for 3 hours at 40° C. The aqueous liquor is separated from the undissolved ore gangue by countercurrent decantation and filtration producing 4000 gallons of clarified liquor containing 33 pounds of $U_3O_8$, 6.5 pounds of $ThO_2$, 70 pounds of Fe, 60 pounds of Al, and 1200 pounds of $SO_4$. The liquor pH is 1.0.

This liquor is transferred to the uranium extraction section where it is contacted countercurrently in 3 mixer-settler stages with an organic solution consisting of 0.1 molar tri-iso-octylamine in 97% kerosene–3% tridecyl alcohol. The aqueous/organic feed ratio is 5.5/1.

The uranium-bearing organic phase is passed to the stripping section where it is contacted in a single mixer-settler stage with an aqueous slurry of magnesium oxide (0.47 molar MgO). The organic/MgO slurry feed ratio is 5/1. The uranium-barren organic phase is recycled to the extraction section. The slurry, containing the uranium in the form of a magnesium uranate precipitate, is filtered. The precipitate is washed, and calcined giving 43.5 pounds of product assaying 75% $U_3O_8$.

The aqueous raffinate, which still contains essentially all of the thorium, iron, aluminum, and sulfate is pumped to the thorium recovery section where it is contacted countercurrently in three mixer-settler stages with an organic solution consisting of 0.05 molar di(tridecyl P)amine in kerosene. The aqueous/organic volume flow to the extraction section is 7.5/1. Essentially all of the iron, aluminum, and sulfate remain in the aqueous raffinate and are pumped to waste. The thorium-bearing organic phase is passed to the stripping section where it is contacted countercurrently in three mixer-settler stages with 41 gallons of 1 M NaCl—0.05 M $H_2SO_4$. The thorium-barren organic phase is recycled to the extraction system. The thorium-bearing strip solution is pumped to the precipitation section where ammonia is added to pH 7 and the thorium precipitates. The precipitate is filtered, washed, and calcined to give the thorium product weighing 6.7 pounds and assaying 95% $ThO_2$.

EXAMPLE II

A uranium-thorium ore is leached with sulfuric acid producing a clarified liquor as described in Example I.

This liquor (4000 gallons containing 33 lb. $U_3O_8$ and 6.5 lb. $ThO_2$ as before) is pumped to the thorium extraction section where it is contacted countercurrently in two mixer-settler stages with an organic solution consisting of 0.05 molar Primene JM–T in kerosene. The aqueous/organic feed ratio to the extraction system is 7.5/1. The thorium-barren aqueous phase which contains 32.8 lb. $U_3O_8$ and essentially all of the iron, aluminum, and sulfate, is passed to a uranium recovery section where the uranium is recovered from solution by adsorption on an anion-exchange resin. The thorium-bearing organic phase is pumped to the stripping section where it is contacted countercurrently in two mixer-settler stages with a stream of 8% $Na_2CO_3$. The organic/aqueous feed ratio to the stripping section is 16/1. The thorium-barren organic phase is recycled to the extraction system. The thorium-bearing strip solution is pumped to the precipitation unit where sulfuric acid is added to pH 5.5 and the thorium precipitates. The precipitate is filtered, washed, and calcined giving the thorium product weighing 7.8 pounds and assaying 80% $ThO_2$. The filtrate containing 0.2 of a pound of $U_3O_8$ and 0.1 of a pound of $ThO_2$ is discarded or recycled to a pregnant liquid surge tank.

EXAMPLE III 2000 pounds of monazite sands is digested in 250 gallons of 93% $H_2SO_4$ at a temperature of 200° C. for a period of two hours. The mixture is cooled to room temperature and diluted slowly with 3000 gallons of water. After an 18 hour aging period the slurry is filtered. The clarified leach liquor produced, totaling approximately 3000 gallons, contains 170 pounds of $ThO_2$, 1100 pounds of rare earth oxides, 5.0 pounds $U_3O_8$, 3200 pounds of $SO_4$ and 700 pounds of $PO_4$. The pH is 0.05. This liquor is transferred to an extraction section where it is passed through 3 mixer-settler units countercurrent to a stream of 0.2 molar Primene JM–T in kerosene. The volume flow of organic to the extraction section is approximately equivalent to that of the liquor. 169 pounds of $ThO_2$ transfer from the aqueous to the organic phase.

The thorium-bearing organic phase is passed to the stripping section where it is contacted countercurrently in 3 mixer-settler stages with 750 gallons of 1.0 molar NaCl—0.05 molar $H_2SO_4$. The thorium-barren organic phase is contacted in a single mixer-settler stage with 5% $Na_2CO_3$ solution at a feed ratio of 4 volumes organic/volume aqueous to remove extracted chloride and is then recycled to the extraction system. The chloride-containing aqueous solution is discarded. The thorium-loaded aqueous stripping solution is pumped to a precipitation unit where anhydrous ammonia is added to pH 7 and the thorium precipitates. The precipitate is filtered, washed, and calcined to give the thorium product which assays 95% $ThO_2$ and weighs 177 pounds.

The raffinate from the thorium recovery cycle, still containing 1095 pounds of rare earth oxides and 4.9 pounds of $U_3O_8$ is contacted countercurrently in 6 mixer-settler stages with a stream of 0.05 molar tri-n-octylamine in 95% kerosene–5% tridecyl alcohol at a flow ratio of about 2.5 volumes of aqueous per volume of organic. The raffinate from the uranium recovery cycle, still containing 1095 pounds of rare earth oxides is pumped to the rare earth recovery unit. The uranium-bearing organic phase is passed to a stripping section where it is contacted countercurrently in 4 mixer-settler stages with 80 gallons 1.0 M NaCl–0.05 M $H_2SO_4$ solution. The uranium-barren organic is recycled to the extracting system. The uranium-loaded aqueous stripping solution is pumped to a precipitation unit where ammonia is added to pH 7 and the uranium precipitates. The precipitate is filtered, washed, and calcined to give the uranium product which assays 80% $U_3O_8$ and contains 4.8 lb. $U_3O_8$.

The foregoing description and examples are not intended to restrict our invention, and it should be limited only as is indicated by the appended claim.

Having thus described our invention, we claim the following:

In a process for segregating and recovering thorium values from a thorium-bearing ore containing rare earth values together with said thorium values which comprises contacting said ore with sulfuric acid, whereby thorium-containing reaction products are formed, dissolving said reaction products in water, contacting the resulting sulfate and thorium-containing solution with an organic solution comprised of a substantially water-immiscible, non-polar organic diluent and an amine having the formula

where $R_1$ is selected from the group consisting of alkyl and alkylene radicals and $R_2$ is selected from the group consisting of hydrogen, alkyl radicals, and alkylene radicals, the total number of carbon atoms in said amine being at least 10, whereby sulfate and thorium values are extracted into the organic phase, leaving rare earth values in the remaining aqueous solution, separating the resulting sulfate and thorium-loaded organic phase from the remaining thorium depleted aqueous phase, and recovering thorium values from the separated organic phase, the improvement comprising recovering said thorium values from said separated organic phase by contacting said separated organic phase with an aqueous stripping solution containing carbonate in the amount of 8 to 9 moles of carbonate per mole of thorium, whereby a precipitate comprised of thorium, sulfate and carbonate is formed, separating said precipitate from the resulting liquid and recovering thorium values from said separated precipitate.

References Cited in the file of this patent

UNITED STATES PATENTS

| | | |
|---|---|---|
| 2,877,250 | Brown | Mar. 10, 1959 |
| 2,910,442 | Kaplan | Oct. 27, 1959 |

OTHER REFERENCES

Brown et al.: AECD–4142, May 27, 1954, pages 6–23. Copy in Scientific Library.

Brown et al.: The Use of Amines as Extractants for Uranium From Acidic Sulfate Liquors. AECD–4142, May 27, 1954. Pages 24–31.

Ross: Raw Materials Conference on Solvent Extraction, held at Winchester, Massachusetts, January 17–18, 1955, TID–7508, April 1, 1955, pages 54–61. Declassified December 15, 1955.

Crouse et al.: (I) ORNL–1959, September 30, 1955, pp. 3–24, 46–56, 71, 74. Copy in Sci. Lib.

Crouse et al.: (II) ORNL–1859, March 2, 1955, 30 pages. (Date declassified January 22, 1958.) Copy in Sci. Library.

Crouse et al.: (III) ORNL–2173, January 11, 1957, 33 pages. Copy in Scientific Library.